Figure 1:
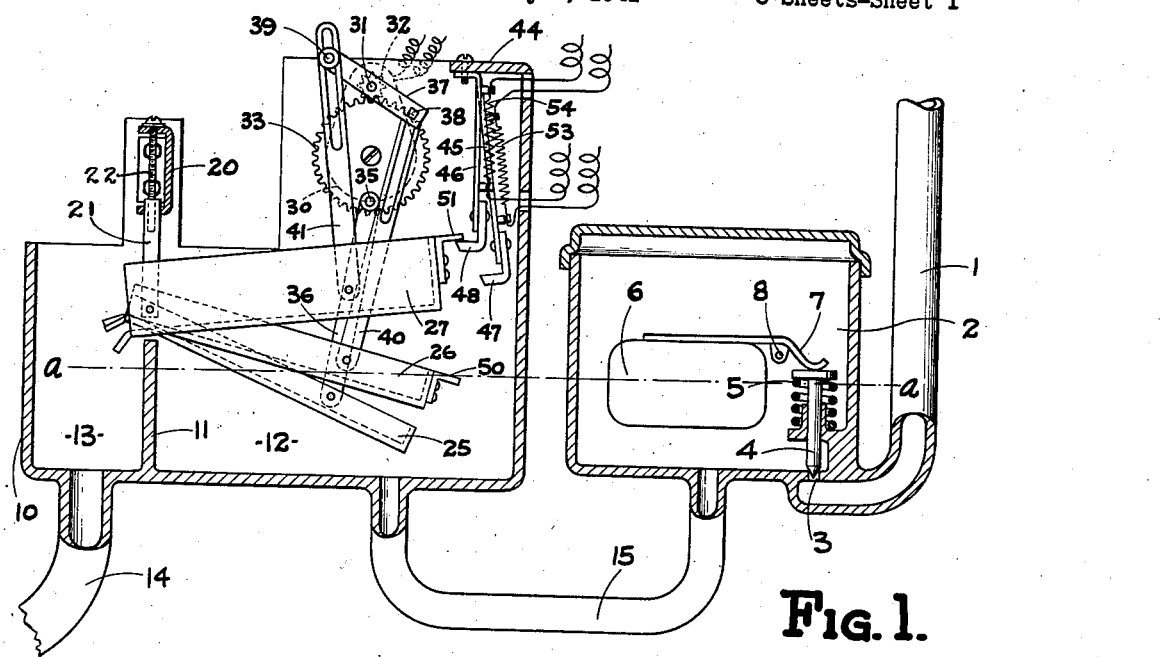

Feb. 8, 1944.　　J. R. KIRKPATRICK　　2,341,145
LIQUID FEEDING MEANS
Filed May 2, 1941　　3 Sheets-Sheet 1

INVENTOR.
JOSEPH R. KIRKPATRICK
BY
ATTORNEY.

Feb. 8, 1944.  J. R. KIRKPATRICK  2,341,145
LIQUID FEEDING MEANS
Filed May 2, 1941  3 Sheets-Sheet 2

INVENTOR.
JOSEPH R. KIRKPATRICK
BY
ATTORNEY.

Feb. 8, 1944.                J. R. KIRKPATRICK                 2,341,145
                              LIQUID FEEDING MEANS
                              Filed May 2, 1941           3 Sheets-Sheet 3
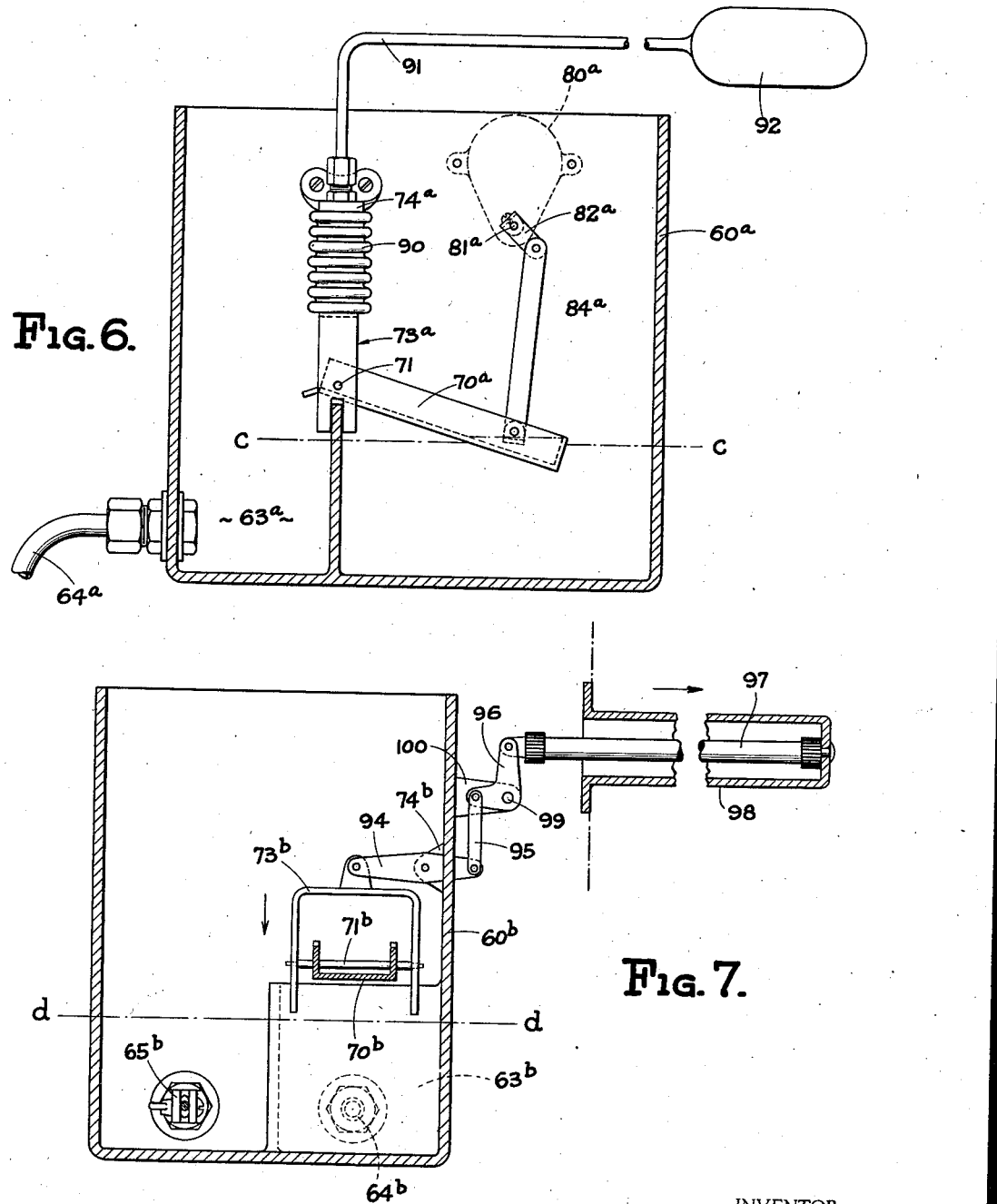
INVENTOR.
JOSEPH R. KIRKPATRICK
BY
ATTORNEY.

Patented Feb. 8, 1944

2,341,145

UNITED STATES PATENT OFFICE

2,341,145

LIQUID FEEDING MEANS

Joseph R. Kirkpatrick, South Euclid, Ohio, assignor to Perfection Stove Company, Cleveland, Ohio, a corporation of Ohio Application May 2, 1941, Serial No. 391,539

4 Claims. (Cl. 221—97)

This application is in part a continuation of one filed by me on October 26, 1940, Serial No. 363,022, and titled "Liquid fuel burning apparatus."

The invention that constitutes the subject matter of the present application, however, is confined to the volumetric liquid feeding means which, in one form, is incorporated in the liquid fuel burning apparatus of the aforesaid application. The instant invention is of broader applicability than might be apparent from the former case and may be used in many instances in which it is desired to accurately feed liquid, especially in small quantities where, for various reasons, a metering valve is more or less unsatisfactory or impractical. For example, I have found my improved volumetric feeding means especially suitable for feeding measured amounts of water to a humidifier in air heating and/or conditioning apparatus and have disclosed herein a second modification employed in that connection.

Furthermore, in certain applications of the instant invention, as in the example just given, the liquid feeding means may involve an adjustment through which the volume of liquid fed may be controlled, and there may be associated with said adjustment, an instrumentality for automatically changing it to control the amount of liquid fed and which, in turn, includes a power generating agency that is sensitive to changes in conditions to which it is subjected and which is so affected thereby as to operate the instrumentality and alter the adjustment thereby to change the feeding capacity of the volumetric feeding means. In the example under consideration, the agency may be a thermostat or a humidostat.

Among the objects of the invention are to provide a liquid feeding means of the oscillating dipper type that is accurate and reliable; that is relatively simple of construction and operation; that is not liable to get out of order, and that is characterized by a very simple and convenient adjustment for varying its feeding capacity. Another object of the invention is to provide automatic means, such as thermostatic or humidostatic, for changing the adjustment aforesaid thereby to control the feeding of the liquid.

A further object is to provide liquid feeding means of the aforesaid type involving a plurality of dippers certain of which may be thrown into and out of operation as occasion requires in order to vary the amount of liquid fed, and to provide a common prime mover or actuator for all the dippers and wherewith said certain ones have a lost-motion connection so that their operation may be suspended without stopping the prime mover or actuator.

Figure 2:
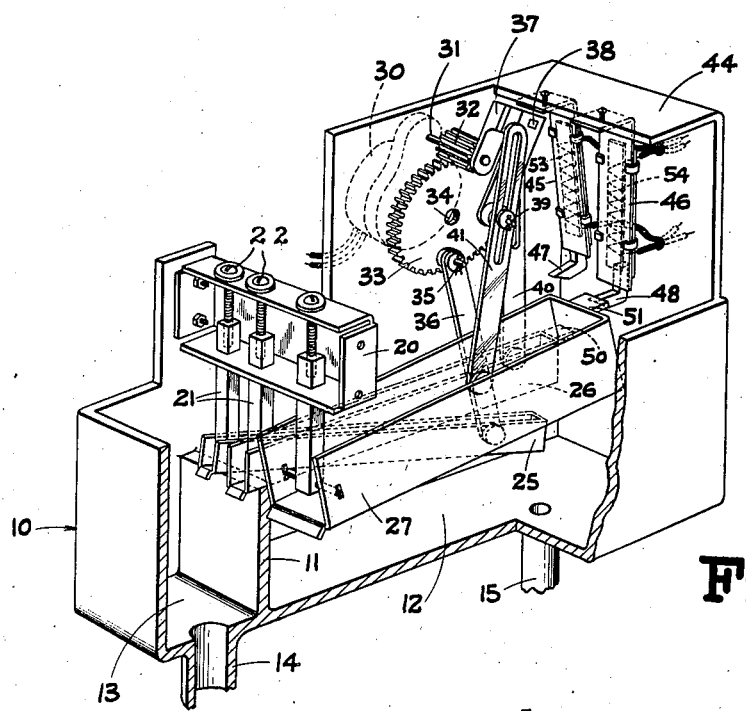
Figure 3:
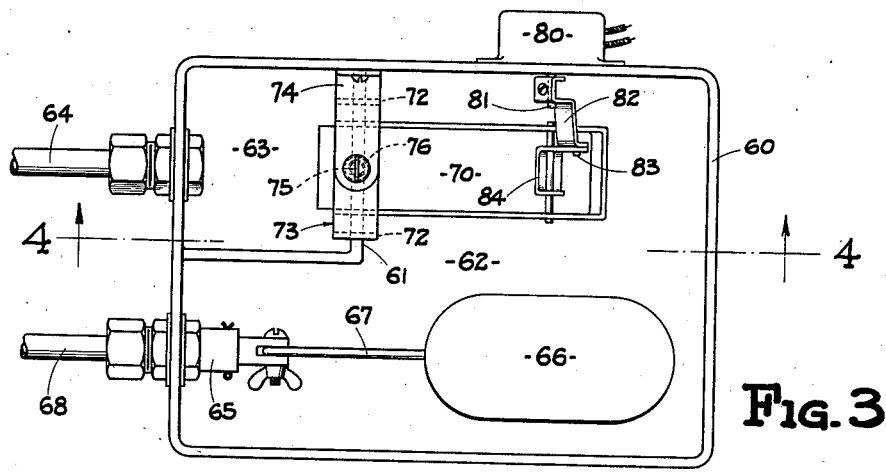
Figure 4:
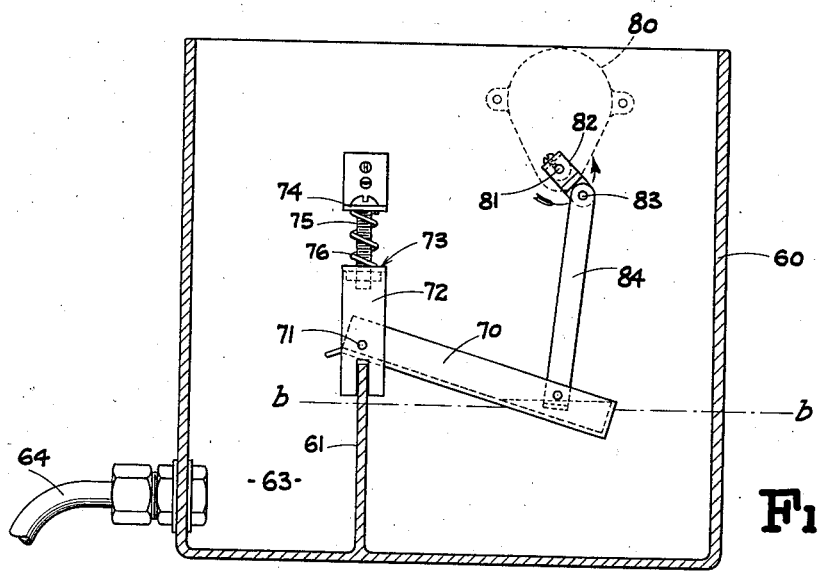
Figure 5:
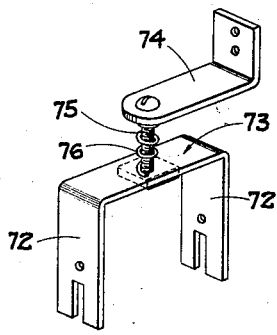

Other more detailed objects will appear as I proceed to describe the invention by reference to the accompanying drawings wherein Fig. 1 is a vertical section through a liquid feeding means incorporating my improvements; Fig. 2 is a detail thereof in perspective with parts broken away; Fig. 3 is a plan view of a modified form of the invention; Fig. 4 is a section on the line 4—4 of Fig. 3; Fig. 5 is a detail in perspective of the adjustment for the pivotal support of the dipper of said modified form; Fig. 6 is a view similar to Fig. 4 showing thermostatic means for automatically actuating the adjusting means of the pivotal support of the dipper, and Fig. 7 is a transverse section through my improved liquid feeding means embodying a modification of the thermostatic means for automatically accomplishing the adjustment of the pivotal support of the dipper.

In the embodiment of the invention illustrated in Figs. 1 and 2, liquid is conducted from a suitable source (not shown) by a conduit 1 to a float chamber 2 wherewith said conduit communicates through a port 3 that is controlled by a valve 4, normally closed, against the action of a spring 5, by a float 6 when the liquid has risen in the float chamber to a given elevation, as that indicated by the line a—a in Fig. 1. This result is brought about through the operative connections between the float and valve consisting of a lever 7 that is pivoted intermediate its ends, as at 8, to the float chamber and bears at one end on the valve 4 and has fastened to its other end the float 6.

10 is a vessel that is divided by a partition 11 into a receiving compartment or reservoir 12 and an outlet compartment 13, the latter discharging through a conduit 14. This conduit may lead to the ultimate point of delivery of the liquid which, according to the disclosure in the aforesaid application, is a liquid fuel burner. The bottom portion of the float chamber 2 communicates with the corresponding part of the reservoir 12 through a conduit 15 to the end that the same liquid level prevails in both the float chamber and reservoir; and it will be observed that the partition 11 extends some distance above the maximum liquid level represented by the line a—a.

Supported by the vessel 10 a material distance above the partition 11 is a channel bar 20, best shown in Fig. 2; and through square holes in the bottom flange of said channel bar are guided, for vertical adjustment, supporting members or hangers 21. These members or hangers, shown as square in cross section and of a size to slidably fit the aforesaid holes, are adjustably supported by screws 22 that are threadedly engaged in axial recesses in the upper ends of the hangers 21 and extend freely through holes in the top flange of the channel bar 20. Pivotally connected to the lower ends of the hangers 21 are the trough-like dippers 25, 26 and 27, the size and capacity of the last mentioned dipper, according to the present embodiment, being considerably greater than the dipper 26, while the dipper 26 is of a somewhat greater capacity than the dipper 25.

Shown (in dotted lines) as supported by and exteriorly of an upwardly extended portion of one of the side walls of the vessel 10 is an electric motor 30 whose drive shaft 31 is projected through an aperture in the wall extension and has fastened to it inwardly beyond said extension a pinion 32 that meshes with a spur gear 33, journaled on a stud 34 that projects inwardly from said wall extension. A crank pin 35 on the gear 33 is operatively connected to the dipper 25, near the free end of the latter, by a connecting rod or link 36. Fastened to the outer end of the motor shaft 31, beyond the pinion 32, is a double crank 37, the diametrically opposed pins whereof are designated 38 and 39. These respective crank pins extend freely through slots in connecting rods or links 40 and 41, the former being attached to the dipper 26 and the latter to the dipper 27.

Secured to and depending from an overhanging portion 44 of the upwardly extended end wall of the vessel 10 are thermostatic elements or bi-metal strips 45 and 46, by the lower free ends of which are carried latch members 47 and 48, respectively, for holding engagement with extensions 50 and 51 on the respective dippers 26 and 27. Electric heaters 53 and 54, in the nature of resistance coils, are suitably attached to the respective thermostatic elements or strips 45 and 46. When the thermostatic elements or strips are cold, so to speak, they occupy the positions indicated in the drawings, elements 46 being in a position to cause the latch member 48 thereof to engage beneath the extension 51 and sustain the dipper 27 in elevated position; while the element or strip 45 is normally in a position to retain the latch member 47 beyond reach of the extension 50 on the dipper 26. The foregoing electrically controlled latch mechanism is taken bodily from the parent application hereinbefore identified, it being understood that electric current from a suitable source is supplied through suitably controlled circuits to the electric heaters or coils 53 and 54. An example of how this may be done is disclosed in the parent application. However, with regard to the instant invention, other types of holding means or latches may be provided for arresting oscillation of the dippers that have lost-motion connection with the actuator. Therefore, I wish it to be understood that the invention in this and other respects is not limited to the details shown further than is required by the terms of the claims annexed hereto.

The form of the invention illustrated in Figs. 3 to 5 may be employed, for example, in feeding water to the humidifier of an air heating and/or conditioning apparatus.

A vessel 60 is divided by a partition 61 into a reservoir 62 and an outlet compartment 63, the latter discharging through a conduit 64 that may lead to the humidifier (not shown).

Disclosed as mounted within an opening in the same end wall of the vessel 60 as that to which the conduit 64 is connected is a float valve 65 of approved type, the float 66 whereof has operative connection with the valve through a stem 67 and serves to retain the valve in closed position when said float is elevated sufficiently by an accumulation of water in the reservoir 62, the maximum water level being indicated by the line b—b of Fig. 4. Water is conducted from a suitable source (not shown) through a conduit 68 to the valve 65.

70 is a dipper supported for oscillation on a pivot member 71 that is carried by and between the side branches 72 of an inverted U-shaped yoke or hanger 73, adjustably suspended from a structural element or bracket 74 thereabove by means of a screw 75. The screw passes freely through an aperture in the bracket 74 and, in effect at least, has threaded connection with the yoke or hanger 72. This end may be accomplished by threading the screw 75 through a tapped hole in the hanger, or passing it through a hole in the hanger and threading it through a nut therebeneath, which nut may be brazed or otherwise secured to the hanger. A spring 76 is shown as interposed between the hanger and the bracket 74. The lower ends of the branches 72 of the hanger 73 are notched for engagement over the upper edge of the partition 61 so as to be guided thereby. By turning the screw 75, the hanger may be raised and lowered to change the elevation of the pivot member 71 thereby to vary the amount of liquid transferred from the reservoir to the outlet compartment at each cycle of operation of the dipper 70, as will hereinafter more fully appear. Mounted on the exterior of the side wall of the vessel 60 that is nearer the dipper 70 is a synchronous low speed electric motor 80, the shaft 81 of which projects through an opening in said wall and has secured to it inwardly thereof a crank 82. The pin 83 of the crank is connected, through a link 84, to a cross pin that is supported by and between the side walls of the dipper near the free end thereof. As the crank pin 83 swings through the lower phase of its orbit, the free end of the dipper 70 is submerged and picks up a quantity of liquid, and as the crank pin swings upward, the free end of the dipper is elevated so as to cause the contents of the dipper to be discharged through the open end into the outlet compartment 63.

The arrangement and relation of the parts are such that when the free end of the dipper is in its most elevated position, as when the crank pin passes through the extreme upper phase of its orbit, the dipper will be in a substantially horizontal position, or in a position inclined slightly downwardly therefrom toward its free or closed end, depending upon the elevation of the pivot member 71; and inasmuch as this may be changed by means of the adjusting screw 75, the quantity of liquid discharged into the outlet compartment 63 may be varied. It follows, therefore, that the amount of liquid transferred from the reservoir to the outlet compartment in a given length of time depends upon two factors, namely: the speed of the motor 80 and the elevation of the pivot member 71. The speed of the motor, if constant, may be such as will effect delivery of the maximum amount of liquid when the elevation of the pivot member is such as will cause the dipper to be substantially horizontal when at the top of its stroke; and to reduce the amount fed, the screw 75 may be turned in a direction to elevate the hanger 72 and consequently the pivot member 71.

As will be readily understood (and, therefore, deemed unnecessary of illustration), the motor in each instance is supplied with electric current from a suitable source through a circuit involving one or more make-and-break devices or switches automatically or manually operated, in the former case as by thermostatic or humidostatic means. Also, thermostatic or humidostatic means may be employed for adjusting the pivotal support of the dipper, thereby to alter the feeding capacity of the device. In Fig. 6, yoke 73ª, that supports the pivot 71ª of the dipper 70ª, is sustained by a bellows 90 that is fixed at its upper end to a bracket 74ª. This bracket is secured to and extends laterally from the adjacent side wall of the vessel 60ª. The bellows 90 communicates through a conduit 91 with a bulb 92 that may be situated, for example, in the heating chamber, or what is known as the "bonnet," of a furnace in conjunction with which the humidifying system is used. The enclosure comprised of the bellows 90, conduit 91 and bulb 92 contains a thermosensitive fluid that acts to cause the bellows to expand as the temperature of the fluid is elevated. As a consequence of this, as the heat of the furnace increases, the yoke 73ª is depressed and consequently the pivotal support of the dipper 70ª is lowered. This effects an increase in the amount of water that is fed, as will be readily understood. The dipper, in the present embodiment, is oscillated by reason of its connection through the link 84ª with the crank 82ª on the shaft 81ª of the motor 80ª. The outlet compartment 63ª of the vessel 60ª discharges through a conduit 64ª, said conduit leading to the evaporator pan or other humidifying element (not shown). As the temperature of the furnace falls and less water is required to maintain the desired humidity of the atmosphere heated by the furnace, the fluid within the enclosure involving the bellows acts to contract the bellows thereby to lift the pivotal support of the dipper and reduce the quantity of water fed or, if lifted high enough, to suspend the feeding of the water altogether. The liquid level in the vessel 60ª is indicated by the line c—c.

In Fig. 7, the yoke 73ᵇ that carries the pivotal support 71ᵇ of the dipper 70ᵇ is suspended from the inner end of a lever 94. This lever is pivoted intermediate its ends to a bracket 74ᵇ that projects inwardly from the adjacent side wall of the vessel 60ᵇ, and the outer end of said lever is coupled, through a link 95 to one end of a bell crank 96 whose opposite end is connected to a rod 97. The rod, which may be of porcelain or other material having a low coefficient of expansion, has its end opposite the bell crank 96 secured to the end of a tube 98 of a material having a higher coefficient of expansion and which tube is subjected to the heat of the furnace, as in the case of the bulb 92, above. The bell crank 96 is pivoted at 99 to a bracket 100 that extends from the side of the vessel 60ᵇ. The sectional view of Fig. 7 is taken as though looking in the direction of the end wall of the vessel that carries the float valve 65ᵇ, and through which the discharge pipe 64ᵇ enters the outlet compartment 63ᵇ. In the present view, the water level is indicated by the line d—d.

As stated above, the automatic control may be effected through humidostatic means, as will be readily understood by those skilled in the art to which the invention pertains, and accordingly where the term "power generating agency" is employed in the claims, it is to be understood as embracing either thermostatic or humidostatic means.

Having thus described my invention, what I claim is:

1. In liquid feeding means, a plurality of dippers each having a discharge end and a receiving end, a pivot member by which each dipper is supported for oscillation, a reservoir in operative relation to which each dipper is disposed, mechanism for oscillating all the dippers whereby to alternately submerge the receiving ends thereof into the liquid in the reservoir and elevate said receiving ends so as to cause the liquid to flow from the discharge ends, and means for suspending operation of certain of said dippers independently of the others while said mechanism is functioning.

2. In liquid feeding means, a plurality of dippers each having a discharge end, a pivot member by which each dipper is supported for oscillation, a reservoir in operative relation to which each dipper is disposed, mechanism for oscillating the dippers whereby to alternately submerge the end of each dipper that is opposite its discharge end into the liquid in the reservoir and elevate said opposite end so as to cause the liquid to flow from the discharge end, means for throwing certain of said dippers into and out of operation, and an adjustment for varying the elevation of the pivot member that is associated with each dipper.

3. In liquid feeding means, a plurality of dippers each having a discharge end and a receiving end, a pivot member by which each dipper is supported for oscillation, a reservoir in operative relation to which each dipper is disposed, means for maintaining a substantially constant liquid level in said reservoir, actuating means for the dippers, lost motion connections between certain of the dippers and said actuating means whereby oscillation of said certain of the dippers may be arrested without stoppage of the actuating means, and holding means movable between an effective and an ineffective position whereby the oscillation of said certain dippers may be suspended by placing the holding means associated therewith in effective position.

4. In liquid feeding means, a reservoir, means for maintaining a substantially constant liquid level in the reservoir, a plurality of trough-like dippers closed at one end and open at the other, a pivot member by which each dipper is supported for oscillation in operative relation to the reservoir, a plurality of cranks, one for each dipper, means common to all cranks for rotating them, operative connections between each dipper and the corresponding crank, said operative connections associated with certain of the dippers being of a lost-motion character, and latch means by which said certain ones of the dippers may be held against oscillation without stopping rotation of the cranks.

JOSEPH R. KIRKPATRICK.